(12) United States Patent
Garozzo

(10) Patent No.: US 7,364,093 B2
(45) Date of Patent: Apr. 29, 2008

(54) THERMOSTAT HAVING DEFAULT CURTAILMENT TEMPERATURE SETTINGS

(75) Inventor: James P. Garozzo, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 474 days.

(21) Appl. No.: 11/156,973

(22) Filed: Jun. 20, 2005

(65) Prior Publication Data

US 2006/0283964 A1  Dec. 21, 2006

(51) Int. Cl.
*F23N 5/20* (2006.01)
*G05D 23/00* (2006.01)
*G05B 13/00* (2006.01)

(52) U.S. Cl. .................. 236/46 R; 236/51; 700/276; 700/296

(58) Field of Classification Search ............ 236/46 R, 236/51; 700/276, 291, 295, 296
See application file for complete search history.

(56) References Cited

U.S. PATENT DOCUMENTS

| | | | |
|---|---|---|---|
| 5,289,362 A * | 2/1994 | Liebl et al. ............ | 700/22 |
| 6,216,956 B1 * | 4/2001 | Ehlers et al. ............ | 236/47 |
| 6,254,009 B1 | 7/2001 | Proffitt et al. | |
| 6,574,581 B1 | 6/2003 | Bohrer et al. | |
| 6,868,293 B1 * | 3/2005 | Schurr et al. ............ | 700/22 |
| 2003/0139854 A1 * | 7/2003 | Kolk et al. ............ | 700/291 |
| 2004/0182941 A1 * | 9/2004 | Alles ................ | 236/49.3 |
| 2005/0005621 A1 * | 1/2005 | Jayadev ................ | 62/230 |
| 2005/0201312 A1 * | 9/2005 | Archacki, Jr. ............ | 370/312 |
| 2006/0065750 A1 * | 3/2006 | Fairless ................ | 236/46 R |

* cited by examiner

*Primary Examiner*—Marc E Norman
(74) *Attorney, Agent, or Firm*—Harness, Dickey & Pierce, P.L.C.

(57) ABSTRACT

A thermostat capable of receiving signals transmitted by a utility provider communicating a usage rate schedule or a request for a load curtailment period, and controlling one or more systems based on the information communicated by the utility. The thermostat changes the set point for each system to the stored predetermined control set point corresponding to the current usage rate schedule period or the curtailment mode period when requested. The thermostat is further capable of discontinuing operation of one or more systems for a minimum predetermined time period during following a request for a load curtailment period.

7 Claims, 3 Drawing Sheets

THERMOSTAT HAVING DEFAULT CURTAILMENT TEMPERATURE SETTINGS

BACKGROUND OF THE INVENTION

The present invention relates to thermostats for controlling the level of operation of one or more systems to correspond with a time-of-use energy rate, and to thermostats that can provide demand side management control to an electric utility provider.

As the demand for electrical power increases during the day, the utility provider experiences an increase in the cost of generating electrical power as a result of secondary "peak" power plants that are switched on to supplement off-peak power generating plants. Many utility providers are consequently establishing real time energy price rates for charging the consumer a variable rate that increases as the cost of generating power increases during peak demand periods. These rates may vary based on a utility price rate schedule, which establishes a different usage price rate for a plurality of specified time periods of the day. Such schedules are also periodically changed by the utility throughout the year. In situations where the peak demand begins to exceed the power generating capacity of the utility's off-peak and peak power plants, the utility may engage in demand side management, which curtails or reduces consumer energy usage to keep the demand from exceeding capacity. Utilities engaging in demand side management transmit a signal to various users of electrical energy to reduce the amount of energy they use during peak demand periods by turning off electrical loads such as air conditioners. In the example of an air conditioner controlled by a conventional thermostat, the user would be billed at a higher rate when the air conditioner runs during peak energy demand periods. Previous attempts have been made to provide a curtailment thermostat that can offset the temperature set point to reduce the amount of energy used during peak demand periods. This type of curtailment thermostat attempts to reduce a consumer's energy usage when energy costs are high. Another type of curtailment thermostat receives a signal from a utility requesting a substantial offset to the temperature setting during a critical peak demand period, which will cause the air conditioner to immediately shut off and remain off until the temperature in the space rose above the substantially offset temperature setting. This would allow the utility to be able to lower energy consumption to keep the peak demand from exceeding their capacity, and the user would be able to save on their energy bill. However, this method of offsetting the temperature setting of a thermostat by a predetermined amount cannot always be relied upon to reduce the operating level of the air conditioner to reduce energy consumption. A consumer may lower the desired temperature setting for the space in anticipation of an offset override by the utility. For example, if the occupant of a space at 75 degrees Fahrenheit lowers the desired temperature setting to 70 degrees in anticipation of a utility offset request, the utility's 6 degree offset request would then raise the temperature setting to 76 degrees. If the temperature in the space subsequently increased to 76 degrees, the air conditioner would be activated to cool the space. If the particular air conditioner does not have the capacity to cool the space much lower than 76 degrees when outside temperatures are in excess of 95 degrees Fahrenheit, the air conditioner may operate for a long period of time. In this case, the utility would not have succeeded in curbing energy consumption during a peak demand period.

SUMMARY OF THE INVENTION

In accordance with one aspect of the invention, various embodiments of a thermostat are provided that are capable of reliably reducing the operation of an air conditioner and other systems to a predetermined level, to provide energy cost savings to the consumer and also load reduction to a utility provider. In one embodiment, the thermostat comprises a receiver means for receiving a usage rate schedule signal transmitted by a utility provider, a memory means for storing the transmitted usage rate schedule information, and a plurality of control set points for each system for each of the usage rate schedule periods, and a processor that looks up the appropriate control set point for each system for the current usage rate schedule period, and controls each system using the appropriate set point to maintain a desired operating level for each system during each usage rate schedule period.

In accordance with another aspect of the present invention, some embodiments of a thermostat are provided that change a control set point to a stored predetermined temperature set point corresponding to the current utility rate period. In one embodiment, the thermostat comprises a memory means for storing the transmitted usage rate schedule or curtailment request information, and for storing a control set point for each system for each of the rate schedule periods. The thermostat further comprises a processor that looks up the appropriate control set point for the current usage rate schedule period, and controls each system using the appropriate set point for maintaining a desired operating level for each system during each rate schedule period. The thermostat may also receive a signal from a utility requesting a curtailment mode, where in response to a request for curtailment mode of operation the processor responsively discontinues operation of one or more systems for a first predetermined time period.

In accordance with another aspect of the invention, one embodiment of a thermostat provides the user with the capability of overriding an elevated temperature set point or a curtailment request from the utility provider. If the thermostat user prefers to lower the set point for comfort reasons, the user may adjust the current temperature set point to a desired setting, which would effect a temporary override of either the predetermined temperature set point or a load curtailment period. The temporary override would remain in effect for a predetermined period of time before reverting to the stored predetermined temperature corresponding to the current usage rate period. The thermostat may also provide two-way communication to alert the utility provider of an override of the utility's request for a curtailment period.

There is also provided, in accordance with another aspect of the invention, a thermostat that also provides control of the operation of one or more systems other than a climate control system. The thermostat may store a control set point for controlling an appliance such as an electric water heater, where the control set point comprises a duty cycle value for controlling the on time of the appliance system by controlling the supply of power to the system. As with the climate control system, the thermostat would reduce the duty cycle during higher energy cost periods, and would discontinue operation for the first predetermined time period upon receiving a request for a load curtailment period. The thermostat could be used to control other systems such as a pool heater system, to further reduce the users energy costs and further improve the load curtailment capability of the utility.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

Corresponding reference numerals indicate corresponding parts throughout the several views of the drawings.

DETAILED DESCRIPTION OF THE EMBODIMENTS

Figure 1:
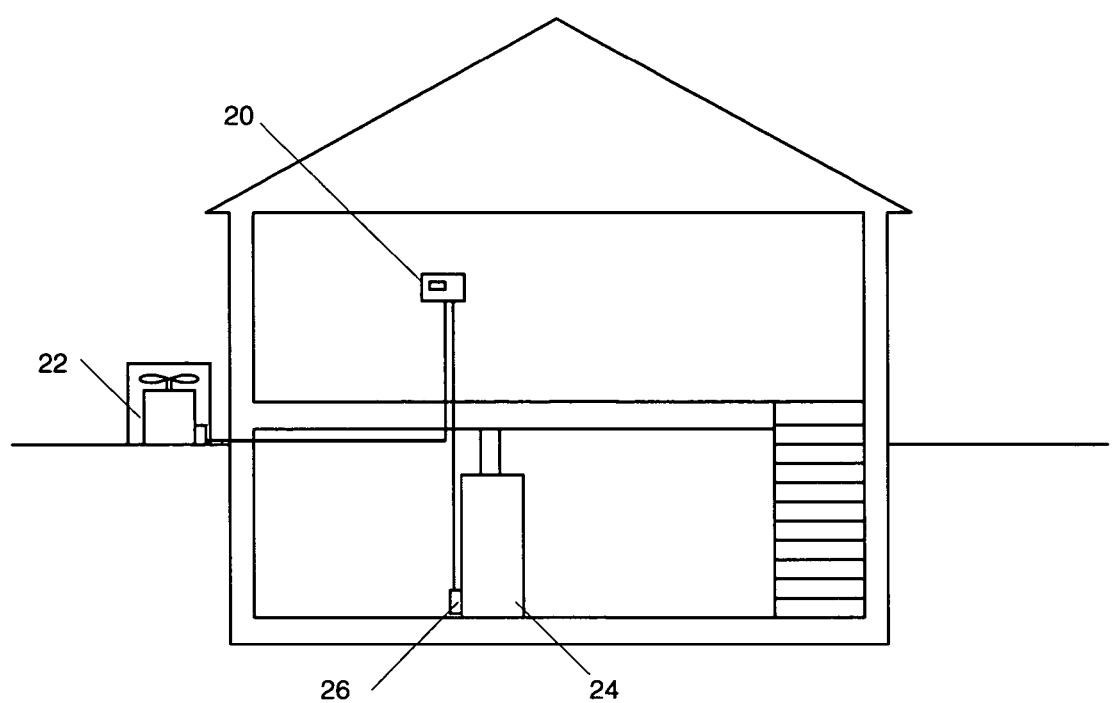
FIG. 1 is an illustration of a building incorporating a thermostat according to the principles of the present invention.

A thermostat incorporating a receiver means for receiving signals transmitted by a utility provider according to the principles of the present invention is shown generally at 20 in FIG. 1. The thermostat 20 may be connected to various systems such as a climate control system 22, an electric water heater 24 or a pool heater (not shown). The thermostat 20 is capable of controlling the operation of one or more of such systems, and of restricting operation of such systems to a predetermined desired level. The thermostat 20 is further capable of receiving a signal transmitted by a utility provider communicating energy usage rate schedule information or a request for load curtailment, and responsively controlling the level of operation of one or more systems based on the information received from the utility. The thermostat 20 is in connection with a contactor 26 that the thermostat 20 can switch on and off to enable or disable the supply of power to the water heater 24, for controlling the operation of the water heater 24. The thermostat 20 may be similarly connected to a second contactor for controlling power to the pool heater in the same manner.

Figure 2:
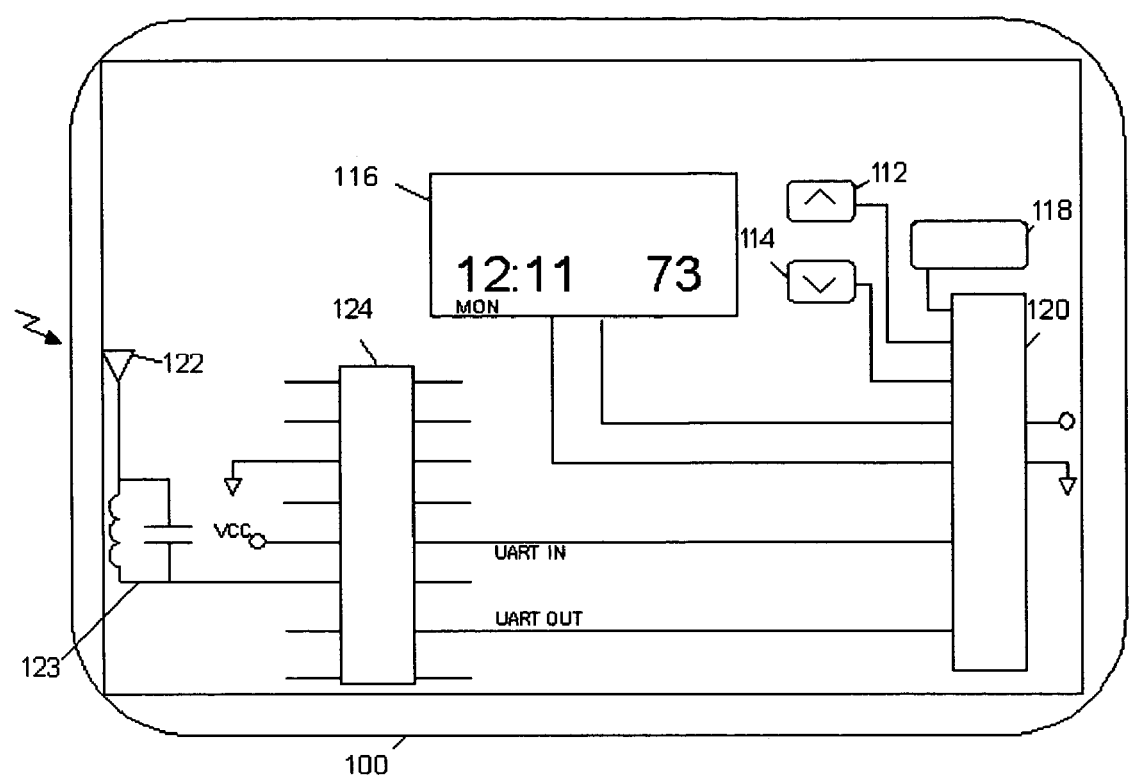
FIG. 2 is a schematic illustration of a thermostat capable of receiving signals transmitted by a utility according to the principles of the present invention.

The thermostat shown in FIG. 2 at 100 comprises a receiver means 124 that is in connection with a processor 120 of the thermostat 100. The receiver means 124 and processor 120 are connected to a low voltage power supply 140. The receiver means 124 is also in connection with a resistor-capacitor filter circuit 123 and an antenna 122. The receiver means 124 is generally a receiver chip capable of receiving a wide area network broadcast signal that is transmitted by a local utility provider. The utility signal is received by the receiver means 124, and the information is decoded and transmitted as a serial bit stream signal from a data port pin of the receiver chip to an input port pin such as a Universal Asynchronous Serial Port (UART) on the processor 120. The processor 120 receives the information, which may be a communication of a usage price rate schedule comprising a set of usage time periods and corresponding set of tiered usage rates. The information may also be a request to enter into a load curtailment period for effecting an immediate reduction in energy usage of one or more systems controlled by the thermostat 100. The processor 120 stores the signal information in an EEPROM memory of the processor 120, but may alternatively store the information in an EEPROM memory external to the processor 120. The processor 120 further comprises a program within the processor that utilizes a control set point for controlling the operation of the thermostat and related systems connected to the thermostat. The processor 120 changes the control set point associated with each system to a stored predetermined set point that corresponds to the current usage rate period stored in the EEPROM memory of the processor. A stored predetermined set point is stored in EEPROM memory for each usage rate period for each system to be controlled by the thermostat.

In one embodiment, the usage rate periods comprise a normal rate period, a low rate period, a medium rate period, a high rate period, and an emergency or critical curtailment period. A corresponding control set point is stored for a plurality of systems, which includes at least a climate control system. In the case of a climate control system, the control set point stored in memory is a predetermined temperature set point. The thermostat 100 may control the operating level of the climate control system based on a predetermined temperature set point value stored in memory corresponding to the current usage rate period. If the current usage rate period was the normal usage rate period for example, the predetermined temperature set point may be 78 degree, in which case the thermostat 120 would control the climate control system to maintain the 78 degree temperature until the next rate period. If the current usage rate period was the low usage rate period for example, the predetermined temperature set point may be 71 degree, in which case the thermostat 120 would control the climate control system to maintain the 71 degree temperature until the next rate period. If the current usage rate period was the high usage rate period, the predetermined temperature set point may be 81 degrees, in which case the thermostat 120 would maintain the elevated 81 degree temperature, which could be relied upon to reduce the operating level of the climate control system. If the thermostat 120 received a signal from the utility requesting a critical load curtailment mode period, the predetermined temperature set point for the curtailment period may be 85 degrees, in which case the thermostat would maintain the substantially elevated 85 degree temperature for the duration of the curtailment period, which could be relied upon to shut off the climate control system for an unspecified time until the temperature rose above 85 degrees.

The thermostat 120 may also respond to a request for a load curtailment period by responsively discontinuing operation of the climate control system for a first minimum predetermined time period, such as 45 minutes, to provide the utility with a reliable means of curtailing or reducing energy consumption for an effective amount of time. Upon expiration of the first predetermined time period, the thermostat would then change the control set point to a substantially elevated temperature set point that would remain in place for a second predetermined time period that ends at the conclusion of the curtailment period. In this embodiment, the load curtailment period is preferably a two hour period, but may be any other length of time suitable for reducing energy usage. In this manner, the thermostat 100 can control the operating level of an air conditioning system or climate control system to provide energy cost savings to the consumer, and also load reduction during peak demand periods to a utility provider. The table below provides an example of predetermined temperatures corresponding to a usage rate schedule that may be stored in memory:

| Usage Rate Periods | | | | |
| --- | --- | --- | --- | --- |
| Normal | Low | Medium | High | Critical |
| 78° F. | 71° F. | 77° F. | 81° F. | 85° F. |

The thermostat 100 may also provide the user with the capability of overriding an elevated temperature set point or a curtailment request from the utility provider. If the thermostat user is occupying the space and prefers to lower the set point for comfort reasons, the user may press a temperature up button 112 or a temperature down button 114 to adjust the current temperature setting to a desired level, which would effect a temporary override of either a predetermined temperature set point or a load curtailment period. The temporary override would remain in effect for a predetermined period of time, which in the present invention is preferably 2 hours, before the processor 120 would restore the control set point to the stored predetermined temperature corresponding to the current usage rate period. The processor 120 is further connected to an LCD display 116, for displaying the current time and temperature setting. The LCD display 116 may also display the current usage rate period as normal, low, medium, high or critical. The thermostat user would then be able to determine whether an override would affect the energy costs that the user would be billed for. Furthermore, the processor 120 may also provide two-way communication via the UART port, to signal the utility provider of an override by the user of the utility's request for a curtailment period. The communication to the utility provider may be accomplished through the use of a transceiver chip used in place of the receiver means 124, or through the use of a separate high frequency output signal from the processor to a transformer for transmitting the signal through a power line to the utility provider. The utility provider would then be made aware of the lack of reduction in energy consumption of a particular user, and could then transmit another load curtailment period signal to another user.

In a second embodiment of the invention, the thermostat may change its control set point during periods when energy costs are high to a predetermined elevated temperature set point, such as 81 degrees. The thermostat would then control the operation of a climate control system to maintain the fixed elevated temperature, which could be relied upon to reduce the operating level of the climate control system more so than an offset of a variable setting. The thermostat may also respond to a utility signal request for a load curtailment period by changing its control set point to a substantially elevated temperature set point, such as 85 degrees, which could be relied upon to shut off the operation of the climate control system for an unspecified time until the temperature in the space increased to 85 degrees. This would allow the utility to immediately reduce the energy demand, to keep the peak demand from exceeding the utility's generating capacity. However, the amount of time that the utility could expect a climate control system to remain off would vary for each building space. Accordingly, this second embodiment of a thermostat may further include a first predetermined time period that the thermostat will discontinue operation of the climate control system in response to a request from a utility for load curtailment. Upon expiration of the first predetermined time period, the thermostat would then change the control set point to a substantially elevated temperature set point that would remain in place for a second predetermined time period that ends at the conclusion of the curtailment period. This would provide the utility with a reliable means of curtailing or reducing energy consumption for an effective amount of time to keep energy demands within their generating capacity during critical peak periods.

A corresponding control set point is stored for a plurality of systems, such as a water heater or pool heater. The thermostat 100 may control the switching of power to such systems to control their operating level based on a predetermined control set point value stored in memory corresponding to the current usage rate period. If the current usage rate period was the normal usage rate period for example, the duty cycle may be 100 percent, in which case the thermostat 120 would supply power to the system for 100 percent of the rate time period. If the current usage rate period was the high usage rate period, the duty cycle may be 50 percent, in which case the thermostat 120 would supply power to the system for 50 percent of the rate time period. In this manner, the thermostat 120 can control the operating level of one or more systems in connection with the thermostat. The thermostat 120 is not required to be connected to such systems, however, and may operate independent of a connection to such systems.

Figure 3:
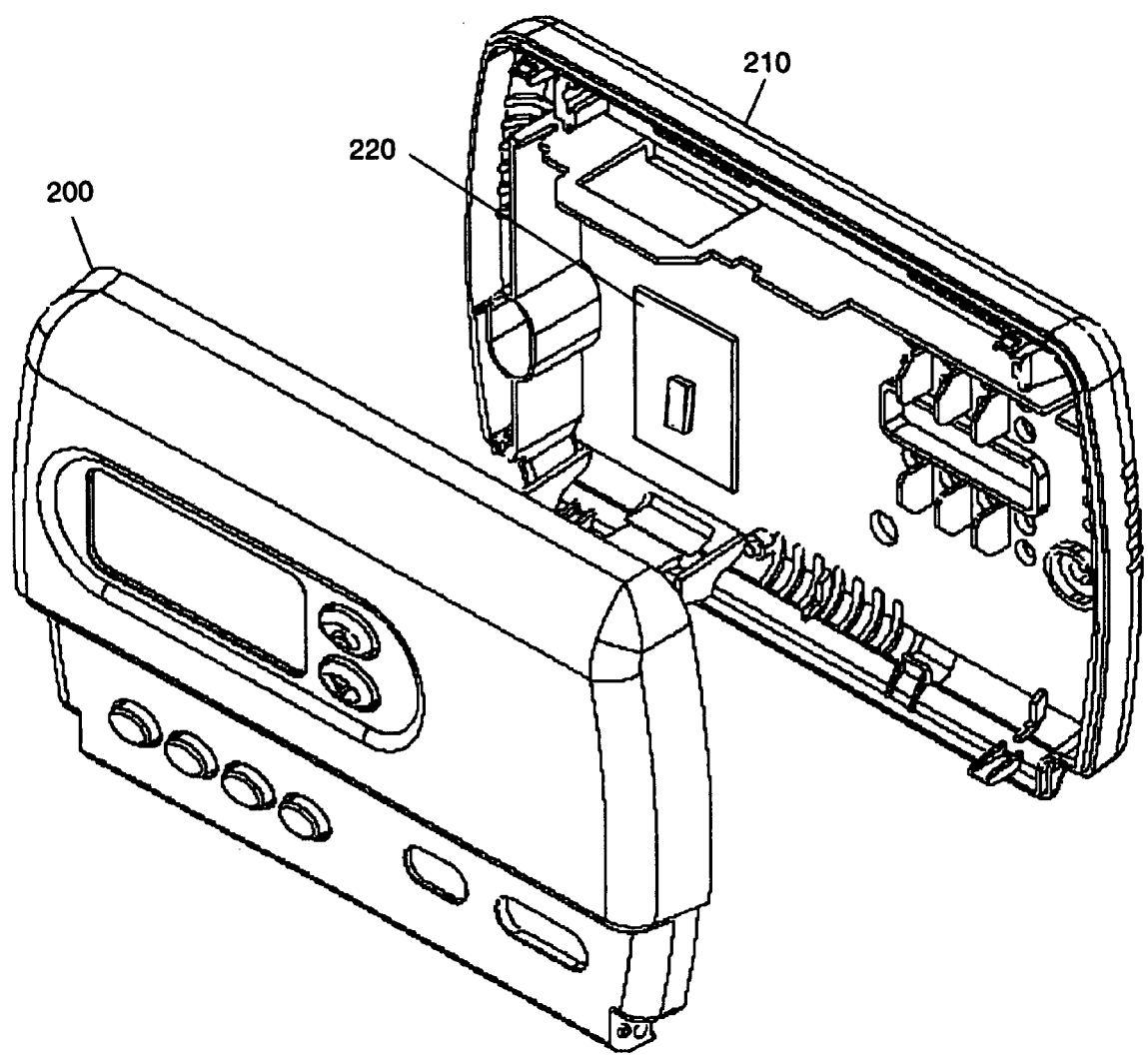
FIG. 3 is an illustration of an alternate embodiment of a thermostat having a receiver means in the sub-base of the thermostat, according to the principles of the present invention.

In a third embodiment of a curtailment thermostat, the thermostat may comprise a receiver means in the sub-base of the thermostat as shown in FIG. 3. The receiver means 220 could be comprised of a receiver chip and antenna mounted on a circuit board in the sub-base 210 of the thermostat 200. The receiver means would still be in connection to the processor of the thermostat 200, and would releasably connected to the processor through the assembly or disassembly of the sub-base 210 and thermostat 200. The sub-base may provide simplicity of assembly of the receiver mean, as well as improved reception of signals transmitted by a utility provider.

In a fourth embodiment of the thermostat according to the principles of the present invention, the climate control system may also be controlled by the thermostat 100 using a duty cycle for the control set point. Specifically, the thermostat may use a predetermined duty cycle to control the on verses off operating time of the climate control system, or it may determine a reduced duty cycle based on the normal duty cycle operation of the climate control system. If the current usage rate period was the normal usage rate period for example, the duty cycle may be 100 percent, in which case the thermostat 120 would allow the climate control system to operate at 100 percent of its normal operating time for maintaining the temperature in the space. If the current usage rate period was the high usage rate period, the duty cycle may be determined to be 50 percent, in which case the thermostat allow the climate control system to operate at 50 percent of its normal operating time for maintaining the temperature in the space. In this manner, the thermostat 120 could also control the operating level of the climate control system, to provide energy cost savings to the consumer, and also load reduction during peak demand periods to a utility provider.

It should be noted that the curtailment thermostat of the present invention may be accomplished through either the use of a temperature set point or a duty cycle set point, the selection of which may be performed by the user through a suitable input on the thermostat. The thermostat may be therefore configurable to enable selection of either mode of controlling the operation of the climate control system. Additional design considerations, readily apparent to one of ordinary skill in the art, such as the modification of the thermostat to include the receiver means in the sub-base of the thermostat, may also provide improved assembly and signal reception. It should be apparent to those skilled in the art that various modifications such as the above may be made without departing from the spirit and scope of the invention. More particularly, the apparatus may be adapted to any of a variety of different systems, including air conditioning systems, water heaters and pool heaters. Accordingly, it is not intended that the invention be limited by the particular form illustrated and described above, but by the appended claims.

What is claimed is:

1. A thermostat for controlling the operation of one or more systems and restricting operation to a desired level, the thermostat comprising:
    a receiver means for receiving signals transmitted by a utility provider, to provide the thermostat with usage rate schedule signal information;
    a memory means for storing the transmitted usage rate schedule information, and a plurality of control set points for each system for each of the usage rate schedule periods; and
    a processor that looks up the appropriate stored control set point for each system for the current usage rate schedule period, and controls each system using the appropriate set point to maintain a desired operating level for each system during each usage rate schedule period, wherein when the receiver means receives a signal transmitted by a utility provider requesting the thermostat to enter into a curtailment mode of operation, the thermostat responsively discontinues operation of one or more systems for a first predetermined time period, and
    wherein the thermostat further comprises a second predetermined time period following the first time period, during which the thermostat looks up a control set point corresponding to the curtailment mode of operation for one or more systems and uses the control set point to control the operation of one or more systems.

2. A thermostat capable of controlling the operation of one or more systems and restricting system operation to a desired level, the thermostat comprising:
    a receiver means for receiving signals transmitted by a utility provider communicating a usage rate schedule or a request for curtailment mode;
    a memory means for storing the transmitted usage rate schedule or curtailment request information, and for storing a control set point for each system for each of the rate schedule periods;
    a processor that looks up the appropriate control set point for each system for the current usage rate schedule period, and controls each system using the appropriate set point for maintaining a desired operating level for each system during each rate schedule period; where in response to a request for curtailment mode of operation, the processor responsively discontinues operation of one or more systems for a first predetermined time period, and wherein the processor looks up a stored control set point value corresponding to a curtailment mode period for each system, and uses the control set point to control the operation of one or more systems for a second predetermined time period following the first predetermined time period.

3. An improved digital thermostat capable of receiving signals transmitted by a utility provider communicating a usage rate period schedule or a request for a load curtailment period, the improvement comprising:
    a memory means for storing a predetermined set point temperature for each usage rate period;
    a processor that chances the control set point for controlling the operation of a climate control system to the stored predetermined set point temperature corresponding to the current usage rate period, wherein the processor discontinues thermostat operation for a first minimum predetermined time period upon receiving a request for a load curtailment period from a utility provider;
    where the processor changes the control set point to the stored predetermined temperature set point corresponding to a load curtailment period after the first minimum predetermined time period expires, and maintains the temperature set point for a second predetermined time period that begins after the first time period and ends at the completion of the load curtailment period.

4. The improved digital thermostat of claim 3, wherein the user may manually override the load curtailment period at the thermostat.

5. The improved digital thermostat of claim 4, wherein the manual override comprises an input to the thermostat to adjust the control set point temperature.

6. The improved digital thermostat of claim 5, wherein the manual override further comprises a temporary predetermined time period, after which the thermostat restores the control set point temperature to the predetermined temperature set point corresponding to the current usage rate period.

7. The improved digital thermostat of claim 6, wherein the thermostat transmits a signal to the utility provider to communicate information indicating an override has been initiated by the user of the thermostat.

* * * * *